US010608487B2

(12) United States Patent
Liang et al.

(10) Patent No.: US 10,608,487 B2
(45) Date of Patent: Mar. 31, 2020

(54) ELECTRIC MACHINE ROTOR

(71) Applicant: Ford Global Technologies, LLC, Dearborn, MI (US)

(72) Inventors: Feng Liang, Troy, MI (US); Leyi Zhu, Novi, MI (US); Lusu Guo, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

(21) Appl. No.: 15/451,550

(22) Filed: Mar. 7, 2017

(65) Prior Publication Data

US 2018/0262069 A1    Sep. 13, 2018

(51) Int. Cl.
*H02K 1/27* (2006.01)
*H02K 21/14* (2006.01)

(52) U.S. Cl.
CPC ......... *H02K 1/2766* (2013.01); *H02K 1/2706* (2013.01); *H02K 21/14* (2013.01)

(58) Field of Classification Search
CPC ..... H02K 1/2706; H02K 1/2766; H02K 21/14
USPC .................................................... 310/156.43
See application file for complete search history.

(56) References Cited

U.S. PATENT DOCUMENTS

| 4,486,679 A * | 12/1984 | Jones | H02K 1/2766 |
| | | | 310/156.53 |
| 4,916,346 A | 4/1990 | Kliman | |
| 6,889,419 B2 | 5/2005 | Reiter, Jr. et al. | |
| 7,795,772 B2 * | 9/2010 | Arimitsu | H02K 1/276 |
| | | | 310/156.53 |
| 7,932,658 B2 * | 4/2011 | Ionel | H02K 1/2766 |
| | | | 310/156.33 |
| 8,890,385 B2 * | 11/2014 | Sano | H02K 1/2766 |
| | | | 310/156.07 |
| 2004/0150282 A1 * | 8/2004 | Murakami | H02K 1/246 |
| | | | 310/156.53 |
| 2012/0200186 A1 * | 8/2012 | Sano | H02K 1/2766 |
| | | | 310/156.01 |
| 2012/0200187 A1 * | 8/2012 | Sano | H02K 1/2766 |
| | | | 310/156.07 |
| 2012/0205573 A1 * | 8/2012 | Komuro | H02K 1/02 |
| | | | 252/62.51 R |
| 2013/0169094 A1 * | 7/2013 | Lee | H02K 1/276 |
| | | | 310/156.01 |
| 2013/0169101 A1 * | 7/2013 | Deng | H02K 1/276 |
| | | | 310/156.53 |
| 2013/0307363 A1 * | 11/2013 | Sano | H02K 1/2766 |
| | | | 310/156.01 |
| 2014/0091664 A1 * | 4/2014 | Aoyama | H02K 1/2766 |
| | | | 310/156.53 |
| 2014/0327329 A1 * | 11/2014 | Kitada | C08G 59/621 |
| | | | 310/43 |

(Continued)

*Primary Examiner* — Alex W Mok
(74) *Attorney, Agent, or Firm* — David B. Kelley; Brooks Kushman P.C.

(57) ABSTRACT

An electric machine includes a unitary, single material substrate defining a rotor lamination including a first region having a predefined magnetic permeability. The rotor lamination includes an arc-shaped second region having a magnetic permeability less than the first region. The second region is oriented such that it impedes flux associated with magnets contained by the first region and perpendicular to quadrature flux field lines associated with the magnets.

13 Claims, 5 Drawing Sheets

(56) References Cited

U.S. PATENT DOCUMENTS

2015/0015093 A1    1/2015  Gontermann et al.
2015/0372548 A1*  12/2015  Nigo .................... H02K 21/16
                                                              310/156.01
2015/0372577 A1*  12/2015  Haussmann .......... H02K 1/246
                                                               310/211

* cited by examiner

US 10,608,487 B2

ELECTRIC MACHINE ROTOR

TECHNICAL FIELD

This disclosure relates to electric machine rotors.

BACKGROUND

Torque is generated by electric machines. Magnetic fields are generated in electric machines for the torque generation. Field shaping regions are used to improve the direction and magnitude of the magnetic fields.

SUMMARY

An electric machine includes a unitary, single material substrate defining a rotor lamination including a first region having a predefined magnetic permeability. The rotor lamination includes an arc-shaped second region having a magnetic permeability less than the first region. The second region is oriented such that it impedes flux contained by the first region and perpendicular to quadrature flux field lines associated with the magnets.

An electric machine includes a unitary, single material substrate defining a rotor lamination including a first region having a predefined magnetic permeability, and an arc-shaped second region having a magnetic permeability less than the first region. The second region is oriented such that the second region impedes magnetic flux perpendicular to quadrature axis flux field lines defined by magnetic poles associated with the rotor lamination.

An electric machine includes a unitary, single material substrate defining a rotor lamination including an outer periphery and a plurality of flux barriers configured to generate reluctance torque through the difference between the d-axis and q-axis reluctences. The lamination includes a first region having a predefined magnetic permeability and an arc-shaped second region having a magnetic permeability less than the first region. The second region is such that it impedes magnetic flux perpendicular to quadrature axis flux field lines defined by magnetic poles associated with the rotor lamination.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machines are used to generate torque using a variety of methods. Some electric machines use permanent magnets to generate rotor magnetic fields. Other electric machines may use induced rotor magnetic fields or wound rotor electromagnets. Regardless, the direction and magnitude of the fields ensure proper torque generation. The magnetic fields may be shaped using a variety of methods. One method that can be used to shape magnetic fields is low magnetic permeability regions. The low magnetic permeability regions impede magnetic flux and redirect the flux to preferred directions. The rotor of the electric machine may be made of substantially one material or at least one substrate. Regions of the electric machine are transformed through plastic deformation, doping, or other methods to control the flow of the magnetic flux through the rotor lamination. The regions may be positioned to eliminate known and undesired fluxes or redirect those fluxes fruitfully.

Figures 1A, 1B:
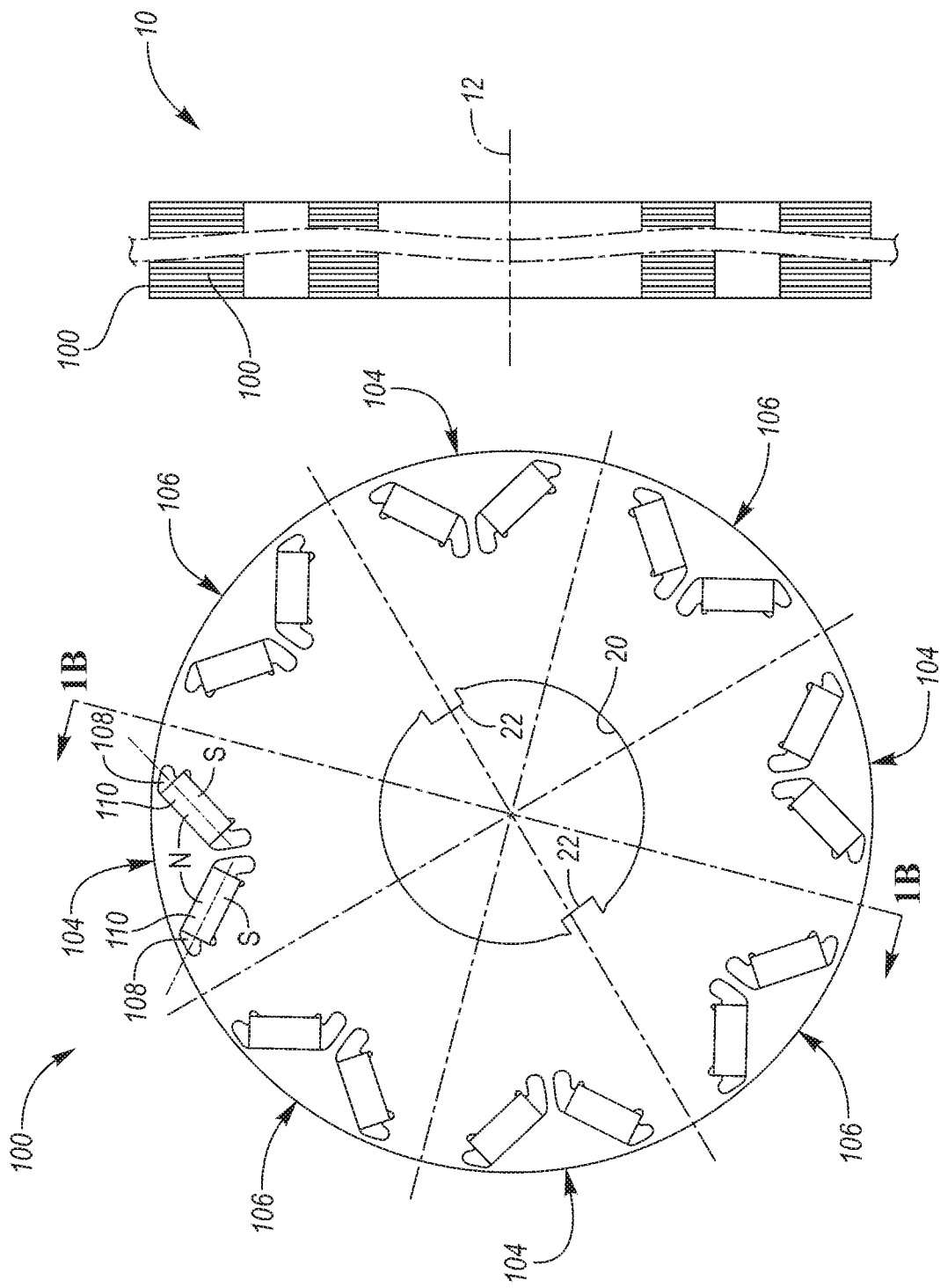
FIG. 1A is a plan view of a permanent magnet synchronous rotor lamination.
FIG. 1B is a side view of rotor laminations stacked to form a rotor or rotor section.

Referring to FIGS. 1A-B, a rotor lamination 100 is shown. The rotor lamination 100 may be stacked with other laminations 100 to form a rotor 10. The laminations 100 may have the same or different layouts. The rotor may rotate about a central axis 12. The lamination 100 may have a pole pitch defining the magnetic poles 104, 106. For an eight-pole machine, the pole pitch is 45°. The poles 104, 106 may alternate between external north poles 104 and external south poles 106. The poles may be formed by permanent magnets 110 situated in pockets 108. The pockets may be arranged in V-shaped magnet pairs to define the magnetic poles 104, 106. The lamination 100 defines an inner hole 20 sized to receive a drive shaft. The inner hole 20 may include drive keys 22 to receive and lock the drive shaft in place.

Figure 2:
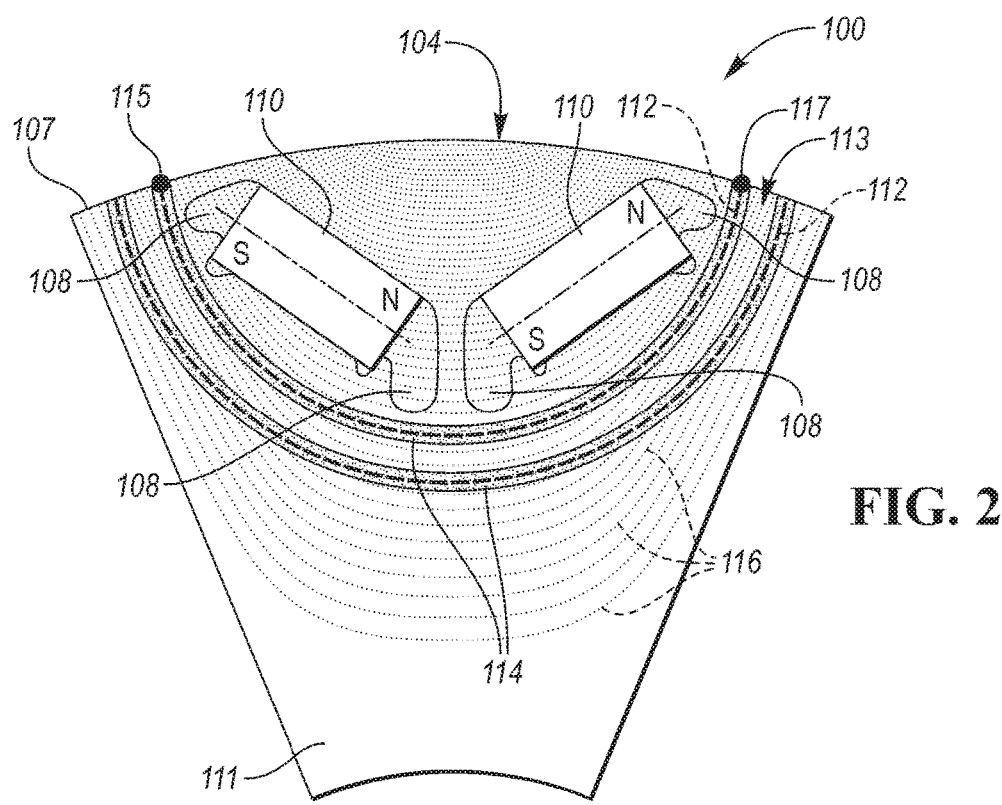
FIG. 2 is a rotor portion having an arc-shaped second region.

Referring to FIG. 2, a section of a rotor lamination 100 is shown. The rotor lamination 100 includes permanent magnets 110 situated in pockets 108 to form magnetic pole 104. The pockets have a V-shaped configuration. The permanent magnets 110 create direct axis flux that emanates the north and south poles of permanent magnets 110 and is perpendicular to quadrature axis flux lines 116 generated by the stator (not shown). The rotor lamination 100, or at least the depicted section, is unitary. Meaning, it is formed from a single substrate and is substantially comprised of one material. Aside from the permanent magnets being nested within the rotor, the rotor lamination 100 is a unitary piece formed of a single substrate material. For example, the substrate material may be electrical steel. Various alternative materials may be used. The permanent magnets 110 may be any type of magnet (e.g., rare-earth, ferrite). The unitary lamination 100 has a first region 111 configured to house the permanent magnets 110. The single substrate of the unitary lamination 100 may have a modified second region 114. The modified second region 114 may be defined by an arcuate shape 112, which may extend between two locations on the outer periphery 107 of the rotor lamination 100. The second region 114 may be defined by another arcuate shape. The second region 114 may have multiple layers or rows, as shown. A channel 113 may be formed by the second region 114 to direct magnetic flux to the outer periphery. The magnetic permeability of the second region 114 is less than the first region 111. The second region is oriented such that the second region 114 impedes direct axis flux generated by the current in the stator winding and contained by the first region 111. The second region, however, may also impede the flux generated by the magnet, which is counterproductive. The second region 114 extends from one point 115 on the outer periphery 107 to another point 117 on the outer periphery 107 enclosing the V-shaped permanent magnets 110 between the outer periphery 107 and the second region 114.

As is known in the art, direct axis ("d-axis") and quadrature axis ("q-axis") magnetic fields are terms used to describe the magnetic flux of the rotor. Fields emanating directly from the salient pole 104 are called the direct axis. Fields emanating perpendicular to the salient pole 104 are called the quadrature axis. The direct axis extends from a pole 104, north or south, from the permanent magnets 110 to the outer periphery 107 of the lamination 100 and the quadrature axis extends from the junction of the north and south poles of each individual magnet 110, as shown by field lines 116.

The permeability of the first region 111 is equal to the permeability of the substrate material, preferably electrical steel with a permeability larger than $4\pi \times 10^{-7}$ H·m$^{-1}$. The second region 114 may have a permeability less than that of the first region 111. The reduced permeability of the second region 114 reduces the harmonic fluxes by changing the magnetic flux distribution on the surface of the magnetic poles 107 or airgap.

The magnetic permeability of the second region 114 may be modified or altered using deformation. Elastic or plastic deformation may be used. In plastic deformation, the substrate of the second region 114 may be deformed using a variety of methods. For example, indentations, peening, deformation, or punching may be used. Shot, laser, cavitation, and wet shot peening may be used. Deformation may cause the crystalline structure of the substrate to change, changing the magnetic permeability of the region deformed. The peening process may occur after the lamination is cast by making indentations in the second region 114. A die may be used to deform the lamination in the second region 114. Any type of deformation known in the art may be used to create the arcuate shape 112 of the second region 114.

The second region 114 magnetic permeability may be modified or altered by doping or modifying the composition of the substrate of the first region 111. For example, phase transformations may be used to alter the magnetic permeability of the substrate to define the second region 114. The lamination 100 may be heated and cooled in the second region 114 to change its magnetic permeability. Additives may be used to maintain altered magnetic permeability. Coating and diffusing may be used to cover the second region 114 and change the permeability of that region. The coating and diffusing may be an alloy including at least aluminum, silicon, carbon, sulfur, germanium, nickel, chromium, or any other combination of materials to change the permeability of the second region 114 without changing the substrate of the first region 111 and lamination 100. The coatings may be applied to some or all of the laminations 100 that are stacked to form the rotor 10. The elements above may be diffused into the substrate of the first region 111 to change its permeability and create the second region 114. For example, manganese and/or nickel, or a combination thereof may be diffused into the unitary, single substrate lamination 100 to alter the magnetic permeability of the second region 114. Additionally, ion implantation may be used to alter the second region 114, while maintaining a unitary, single substrate lamination 100.

A unitary lamination 100 comprises a first region 111 and second region 114 formed from a common substrate that is cast, pressed, or otherwise formed. Inserts or vacant areas are not second regions because they are not part of the rotor lamination 100. For example, voids are used in the art to prevent permanent magnet flux leakage and are not second regions because they are not part of the lamination or singular substrate. The modification methods and apparatuses formed by such methods as described above are applied to a single substrate and only a single material composition is used for the substrate.

Figure 3:
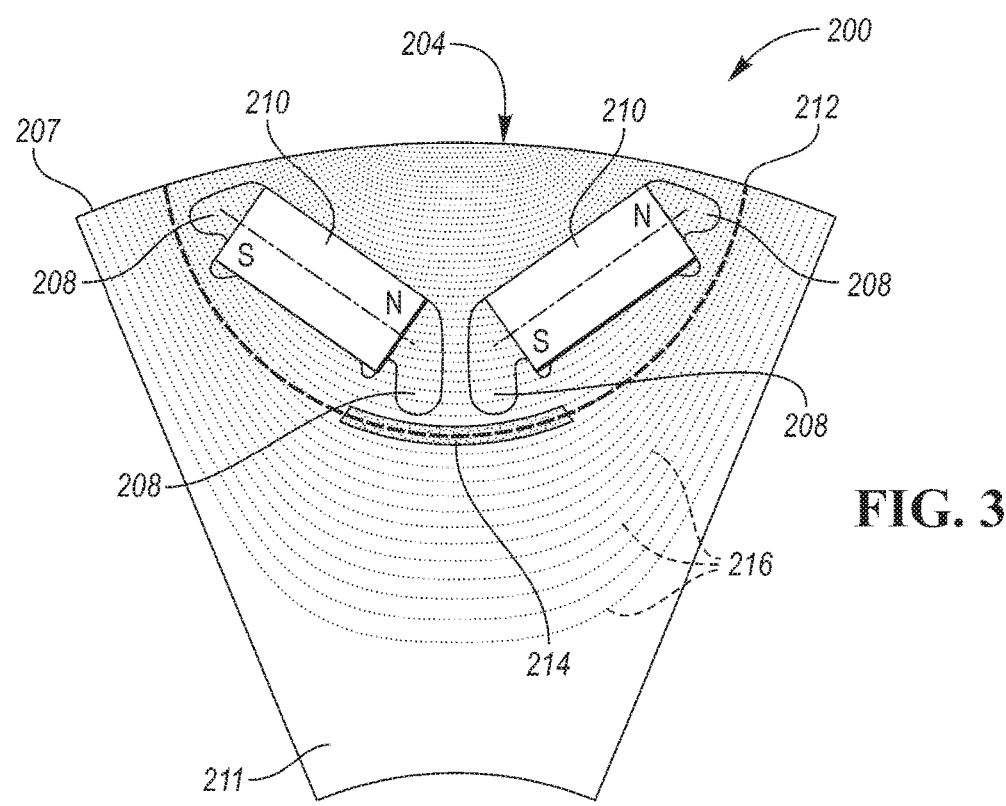
FIG. 3 is a rotor portion having a reduced arc-shaped second region.

Referring to FIG. 3, a section of a rotor lamination 200 is shown. The rotor lamination 200 includes permanent magnets 210 situated in pockets 208 to form magnetic pole 204. The pockets have a V-shaped configuration. The permanent magnets 210 create direct axis flux that emanates the north and south poles of permanent magnets 210 and is perpendicular to quadrature axis flux lines 216. The rotor lamination 200 is unitary. Aside from the permanent magnets being nested within the rotor 10, the rotor lamination 200 is a unitary piece formed of a single substrate material. For example, the substrate material may be electrical steel. Various alternative materials may be used. The permanent magnets 210 may be any type of magnet (e.g., rare-earth, ferrite). The unitary lamination 200 has a first region 211 configured to house the permanent magnets 210. The single substrate of the unitary lamination 200 may have a modified second region 214. The modified second region 214 may be defined by an arcuate shape 212 or a portion thereof, which extends between two locations on the outer periphery 207 of the rotor lamination 200. The second region 214 may have additional rows or layers as shown in FIG. 2. The magnetic permeability of the second region 214 is less than the first region 211. The second region is oriented such that the second region 214 impedes direct axis flux generated by the current in the stator winding and contained by the first region 211. As is known in the art, d-axis and q-axis magnetic fields are used to describe the direct axis and quadrature axis. The second region 214 is shown substantially between the central axis 12 and the outer periphery 207.

Figure 4:
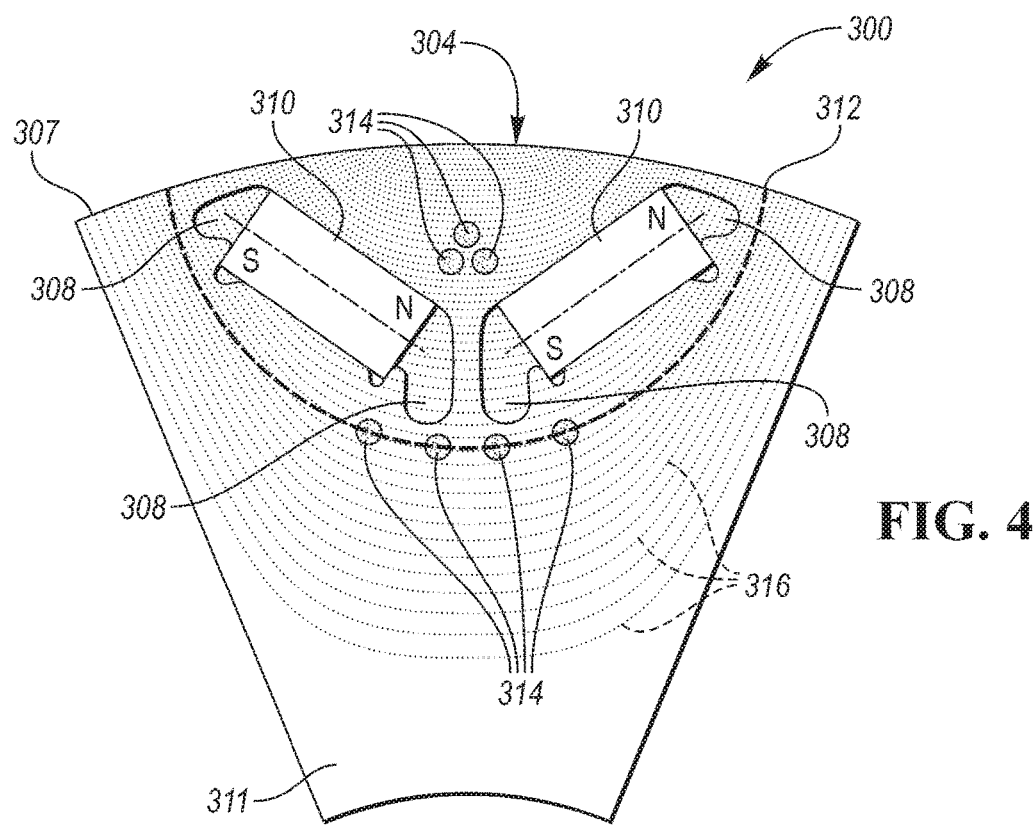
FIG. 4 is a rotor portion having an arc-shaped second region having distinct sections.

Referring to FIG. 4, a section of a rotor lamination 300 is shown. The rotor lamination 300 includes permanent magnets 310 situated in pockets 308 to form magnetic pole 304. The pockets have a V-shaped configuration. The permanent magnets 310 create direct axis flux that emanates the north and south poles of permanent magnets 310 and is perpendicular to quadrature axis flux lines 316. The rotor lamination 300 is unitary. Aside from the permanent magnets being nested within the rotor 10, the rotor lamination 300 is a unitary piece formed of a single substrate material. For example, the substrate material may be electrical steel. Various alternative materials may be used. The unitary lamination 300 has a first region 311 configured to house the permanent magnets 310. The single substrate of the unitary lamination 300 may have a modified second region 314. The modified second region 314 may be defined by an arcuate shape 312 or a portion thereof, which extends between two locations on the outer periphery 307 of the rotor lamination 300. The second region 314 may have additional rows or layers as shown in FIG. 2. The second region 314 is shown at distinct locations about the arcuate shape 312. The location of the second region 314 may vary. For example, the second region 314 may be anywhere along the arcuate shape 312 and may reside on additional rows or layers of the arcuate shape 312. Meaning, the arcuate shape 312, and second region 314, are not laterally limited. Some portions of the second region 312 may reside on different arcuate shapes to limit flux perpendicular to the quadrature axis field lines 316. The magnetic permeability of the second region 314 is less than the first region 311. The second region is oriented such that the second region 314 impedes direct axis flux generated by the current in the stator winding and contained by the first region 311. As is known in the art, d-axis and q-axis magnetic fields are used to describe the direct axis and quadrature axis. Additional portions of the second region 314 may be defined or disposed between the V-shaped pair of permanent magnets 310. The position of this portion of the second region 314 may have three sections in a triangle configuration, as shown, to impede direct axis flux generated by the current in the stator winding.

Figure 5:
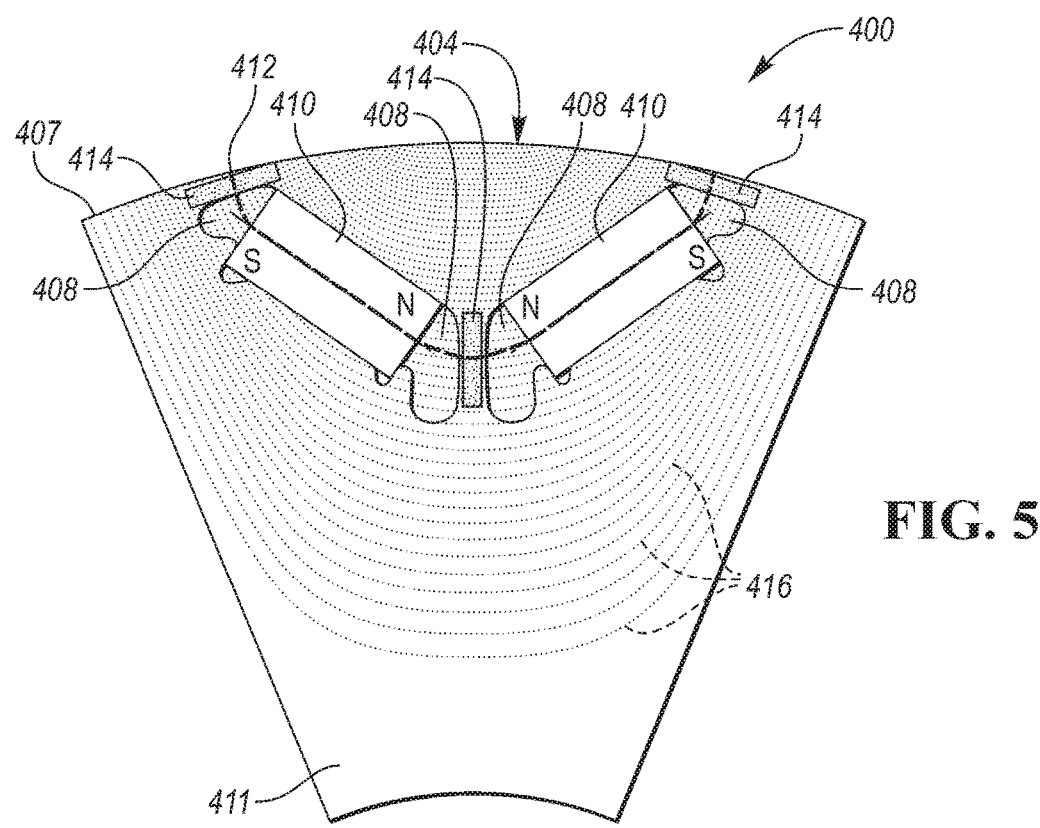
FIG. 5 is a rotor portion, representative quadrature axis field lines, and a second region defined on bridges of the rotor portion.

Referring to FIG. 5, a section of a rotor lamination 400 is shown. The rotor lamination 400 includes permanent magnets 410 situated in pockets 408 to form magnetic pole 404. The pockets have a V-shaped configuration. The permanent magnets 410 create direct axis flux that emanates the north and south poles of permanent magnets 410 and is perpendicular to quadrature axis flux lines 416. The rotor lamination 400 is unitary. Aside from the permanent magnets being nested within the rotor, the rotor lamination 400 is a unitary piece formed of a single substrate material. For example, the substrate material may be electrical steel. Various alternative materials may be used. The permanent magnets 410 may be any type of magnet (e.g., rare-earth, ferrite). The unitary lamination 400 has a first region 411 configured to house the permanent magnets 410. The single substrate of the unitary lamination 400 may have a modified second region 414. The modified second region 414 may be defined by an arcuate shape 412, which extends between two locations on the outer periphery 407 of the rotor lamination 400. The magnetic permeability of the second region 414 is less than the first region 411. The second region is oriented such that the second region 414 impedes direct axis flux generated by the current in the stator winding and contained by the first region 411. The second region 414 may be located on center, top, or other bridges associated with the permanent magnets 410 and pockets 408. The second region 414 may be only a portion of the bridges.

Figure 6A:
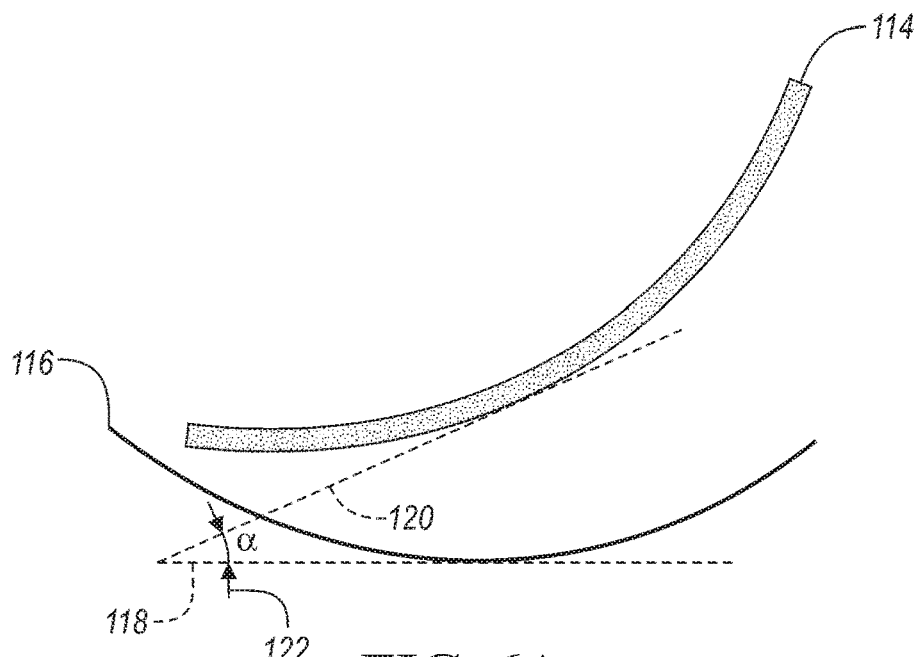
FIG. 6A is an arc-shaped second region offset from a quadrature axis flux line.
Figure 6B:
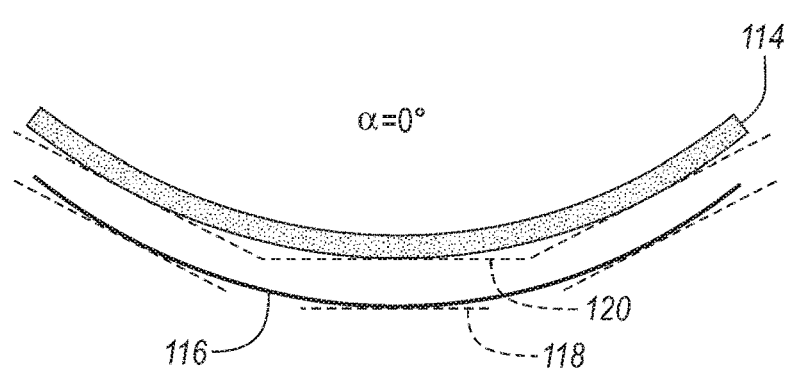
FIG. 6B is an arc-shaped second region superimposed on a quadrature axis flux line.
Figure 6C:
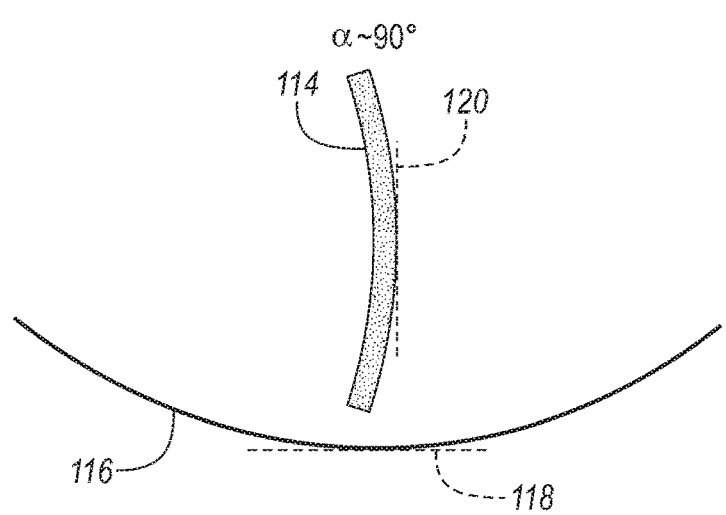
FIG. 6C is an arc-shaped second region substantially perpendicular to a quadrature axis flux line.

Referring to FIGS. 6A-C, a quadrature axis current flux line 116 is shown. The second region 114 or arcuate shape is shown having a tangent line 120 being offset at an angle, α, 122 from a line 118 tangent to the flux line 116. At a corresponding distance from an intersection line, the second region 114 or arcuate shape may be angled to provide a different flux channel shape. The angle may be driven by a relative position of the permanent magnets 110. The angle 122 may be preferably between ±45°. The angle 122 may be most preferably be set to zero, making the second region 114 parallel to the quadrature axis flux lines generated by the stator. In another embodiment, the angle 118 may be ±90° or perpendicular to the quadrature axis flux lines 122.

Figure 7:
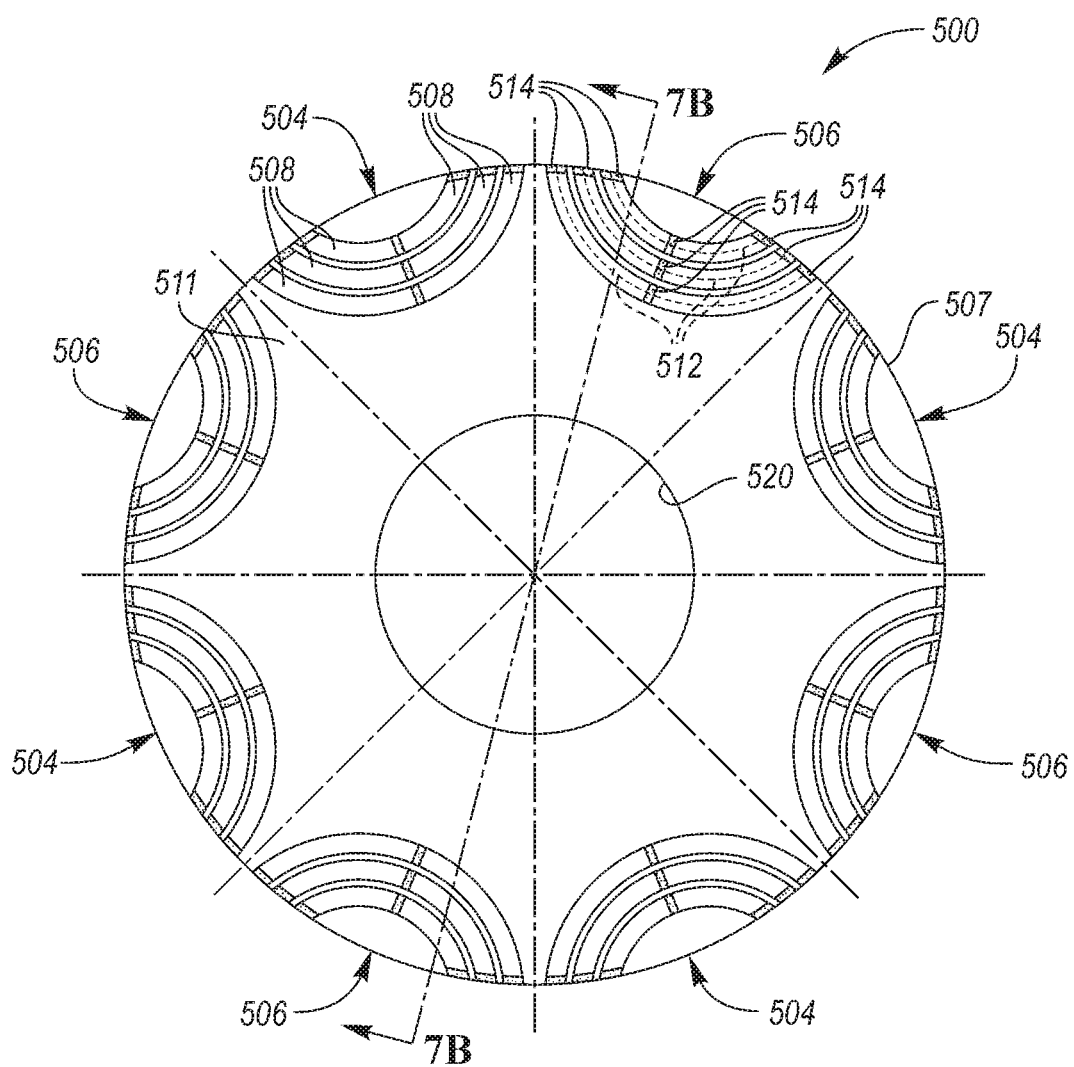
FIG. 7 is a plan view of a reluctance rotor.

Referring to FIG. 7, a lamination 500 of a reluctance rotor is shown. The lamination 500 has alternating magnetic poles 504, 506. The poles are defined by a plurality of flux barriers 508 having a particular shape configured to generate torque through a difference between and d-axis and q-axis magnetic flux. The rotor lamination 500 has a first region 511. The first region 511 may be electrical steel having a predefined magnetic permeability. The flux barriers 508 may define a plurality of bridges for mechanical support of the rotor lamination 500. The bridges may partially define a second region 514 having a different magnetic permeability than the first region 511. The lamination may include both the first and second region and be a unitary, single substrate construction. Meaning, the entire lamination 500 may be electrical steel with the second regions 514 being modified to alter its magnetic permeability. Portions of the second region 514 may be defined by an arcuate shape 512. The arcuate shape 512 may be defined by the flux barriers 508, which also define the support bridges. The rotor lamination may have an inner diameter 520 for receiving a drive shaft.

Although the second region may be defined about an arcuate shape, the second region may be defined by other shapes as well. For example, the defining shape may have corners or angled areas. The second region may have distinct sections that may include corners or angled areas. The second region may also be linear.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:
1. An electric machine comprising:
  a unitary, single material substrate defining a rotor lamination including
    a first region having a predefined magnetic permeability,
    second region including a plurality of discrete adjacent solid sections arranged in an arc, having a magnetic permeability less than the first region, and oriented such that the second region impedes flux contained by the first region and perpendicular to quadrature axis flux field lines associated with V-shaped magnets surrounded by the substrate, and
    a magnet free solid region, between the V-shaped magnets, having three discrete adjacent solid sections arranged in a triangular configuration with a magnetic permeability less than the first region.
2. The electric machine of claim 1, wherein the lamination further defines an outer periphery and wherein the second region extends from one point on the outer periphery to another point on the outer periphery enclosing the V-shaped permanent magnet between the outer periphery and the second region.

3. The electric machine of claim 2, wherein the second region is substantially between the permanent magnet pockets and an axis of the rotor.

4. The electric machine of claim 3, wherein the second region has distinct sections.

5. The electric machine of claim 1, wherein the sections are circular sections.

6. The electric machine of claim 1, wherein the second region has a portion that is parallel to the lines.

7. The electric machine of claim 1, wherein the second region is plastically deformed to change its magnetic permeability.

8. The electric machine of claim 1, wherein the second region is coated and diffused to change its magnetic permeability.

9. The electric machine of claim 8, wherein the coating and diffusion includes Manganese and Nickel.

10. The electric machine of claim 1, wherein the first region is electrical steel and the second region includes at least one of aluminum, silicon, carbon, sulfur, germanium, nickel, or chromium.

11. An electric machine comprising:
a unitary, single material substrate defining a rotor lamination including an outer periphery and a plurality of flux barriers configured to generate torque through a difference between d-axis and q-axis magnetic flux, and having
a first solid region having a predefined magnetic permeability,
an arc-shaped second solid region, having a magnetic permeability less than the first solid region such that the second solid region impedes magnetic flux perpendicular to quadrature axis flux field lines defined by magnetic poles associated with the rotor lamination, and
a magnet free solid region between magnets disposed within the substrate and having three discrete adjacent solid sections arranged in a triangular configuration with a magnetic permeability less than the first region.

12. The electric machine of claim 11, wherein the second region forms a bridge between at least one of the plurality of flux barriers and the outer periphery.

13. The electric machine of claim 11, wherein the second region forms a bridge between at least two of the plurality of flux barriers.

* * * * *